United States Patent [19]

Nieboer et al.

[11] Patent Number: 5,243,785
[45] Date of Patent: * Sep. 14, 1993

[54] PANEL ASSEMBLY FOR VEHICLES WITH MOLDED REGULATOR ATTACHMENT

[75] Inventors: Keith A. Nieboer, Holland; Roger L. Koops, Hamilton, both of Mich.

[73] Assignee: Donnelly Corporation, Holland, Mich.

[*] Notice: The portion of the term of this patent subsequent to Nov. 19, 2008 has been disclaimed.

[21] Appl. No.: 762,892

[22] Filed: Sep. 19, 1991

Related U.S. Application Data

[63] Continuation-in-part of Ser. No. 671,373, Mar. 19, 1991, Pat. No. 5,065,545.

[51] Int. Cl.$^5$ .............................................. E05F 11/38
[52] U.S. Cl. ........................................ 49/375; 49/351
[58] Field of Search ................ 49/375, 374, 351, 350, 49/363

[56] References Cited

U.S. PATENT DOCUMENTS

| | | |
|---|---|---|
| 2,296,811 | 9/1942 | Devereaux . |
| 2,379,924 | 1/1941 | Roethel . |
| 2,381,365 | 8/1945 | Parsons . |
| 2,676,042 | 4/1954 | Roethel . |
| 2,772,901 | 12/1956 | Roethel . |
| 2,850,333 | 12/1956 | Hamman . |
| 3,061,363 | 10/1962 | Martinez . |

(List continued on next page.)

FOREIGN PATENT DOCUMENTS

| | | |
|---|---|---|
| 294254 | 12/1988 | European Pat. Off. . |
| 362018 | 4/1990 | European Pat. Off. . |
| 1001919 | 1/1957 | Fed. Rep. of Germany . |
| 3545856 | 1/1987 | Fed. Rep. of Germany . |
| 8413286 | 7/1987 | Fed. Rep. of Germany . |
| 2186059 | 1/1974 | France . |
| 2575976 | 7/1986 | France . |
| 2627555 | 8/1989 | France . |
| 2649749 | 1/1991 | France . |
| 58-417 | 1/1983 | Japan . |
| 59-199228 | 11/1984 | Japan . |
| 61-186619 | 8/1986 | Japan . |
| 9012943 | 11/1990 | PCT Int'l Appl. . |
| WO8704126 | 7/1987 | Sweden . |
| 500768 | 2/1939 | United Kingdom . |
| 1080271 | 8/1967 | United Kingdom . |
| 1410680 | 10/1975 | United Kingdom . |
| 1411907 | 10/1975 | United Kingdom . |
| 2192658A | 1/1988 | United Kingdom . |
| 2216166 | 10/1989 | United Kingdom . |

OTHER PUBLICATIONS

Copy of European Search Report in English, corresponding to European patent application Ser. No. 92302352 and dated Nov. 3, 1992.

*Primary Examiner*—Philip C. Kannan
*Attorney, Agent, or Firm*—Price, Heneveld, Cooper, DeWitt & Litton

[57] ABSTRACT

A panel/window assembly for vehicles adapted to be raised and lowered by a window regulator mechanism. The assembly includes at least one regulator mechanism attachment member molded directly on one peripheral edge of a preferably transparent sheet from a resinous material, preferably reaction injection molded polyurethane. The attachment member may include either a generally C-shaped channel having an elongated slot opening to one side or an elongated opening extending entirely through the attachment member. The opening or channel in each attachment member is adapted to receive a roller or slide mechanism coupled to the regulator mechanism. Preferably, the slide is coupled to the regulator arm by a cap received over the end of the arm and includes a pivot joint allowing movement about multiple axes. The panel/window assembly allows installation on existing or new regulator assemblies and requires less time and fewer tools to install than conventional window assemblies.

48 Claims, 10 Drawing Sheets

U.S. PATENT DOCUMENTS

| | | |
|---|---|---|
| 3,228,677 | 1/1966 | Martens . |
| 3,263,014 | 7/1966 | Deisenroth . |
| 3,381,340 | 5/1968 | Chapin, Jr. . |
| 3,516,884 | 6/1970 | Heeter et al. . |
| 3,872,198 | 3/1975 | Britton . |
| 3,919,022 | 11/1975 | Stefanik . |
| 4,119,341 | 10/1978 | Cook . |
| 4,120,120 | 10/1978 | Becker . |
| 4,139,234 | 2/1979 | Morgan . |
| 4,353,185 | 10/1982 | Saigne . |
| 4,442,633 | 4/1984 | Gianotti . |
| 4,449,326 | 5/1984 | Hori et al. ............................. 49/375 |
| 4,457,109 | 7/1984 | Royse . |
| 4,561,211 | 12/1985 | Raley et al. . |
| 4,561,625 | 12/1985 | Weaver . |
| 4,571,278 | 2/1986 | Kunert . |
| 4,584,155 | 4/1986 | Zanella . |
| 4,591,205 | 5/1986 | Furman . |
| 4,626,185 | 12/1986 | Monnet . |
| 4,648,832 | 3/1987 | Reilly et al. . |
| 4,662,113 | 5/1987 | Weaver . |
| 4,688,752 | 8/1987 | Barteck et al. . |
| 4,694,610 | 9/1987 | Hornivius . |
| 4,695,420 | 9/1987 | Grawey et al. . |
| 4,712,287 | 12/1987 | Johnston . |
| 4,723,809 | 2/1988 | Kida et al. . |
| 4,755,339 | 7/1988 | Reilly et al. . |
| 4,761,916 | 8/1988 | Sanok et al. . |
| 4,762,481 | 8/1988 | Weaver . |
| 4,765,672 | 8/1988 | Weaver . |
| 4,776,132 | 10/1988 | Gold . |
| 4,778,366 | 10/1988 | Weaver . |
| 4,792,425 | 12/1988 | Weaver . |
| 4,795,667 | 1/1989 | Armstrong . |
| 4,805,346 | 2/1989 | Gergoe . |
| 4,823,511 | 4/1989 | Herliczek et al. . |
| 4,826,417 | 5/1989 | Reilly et al. . |
| 4,830,804 | 5/1989 | Weaver . |
| 4,834,931 | 5/1989 | Weaver . |
| 4,839,122 | 6/1989 | Weaver . |
| 4,854,636 | 8/1989 | Greenhaigh et al. . |
| 4,894,972 | 1/1990 | Endoh et al. . |
| 4,915,395 | 4/1990 | Barteck . |
| 4,925,511 | 5/1990 | Ikeda et al. . |
| 4,943,179 | 7/1990 | Horiki et al. . |
| 4,955,161 | 9/1990 | Bertolini ........................... 49/363 X |
| 4,986,029 | 1/1991 | Richter . |
| 4,986,030 | 1/1991 | Bertolini et al. .................. 49/375 X |
| 4,987,699 | 1/1991 | Gold ...................... 49/375 |
| 4,998,379 | 3/1991 | Yamada et al. . |
| 5,050,348 | 9/1991 | Kane et al. . |
| 5,065,545 | 11/1991 | Kane et al. ............................. 49/375 |

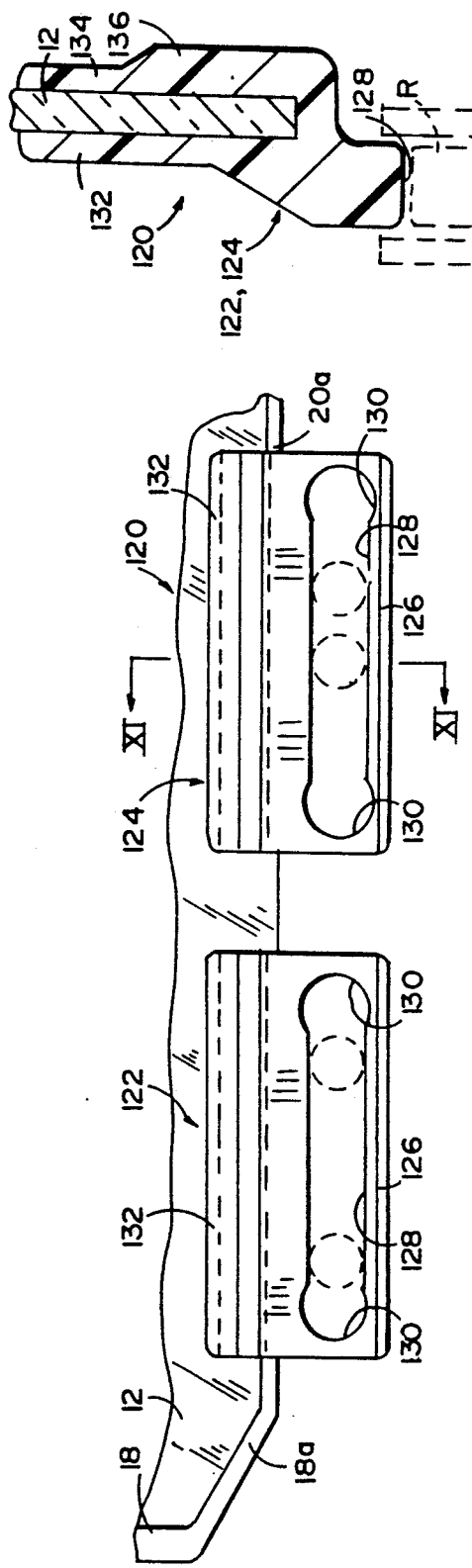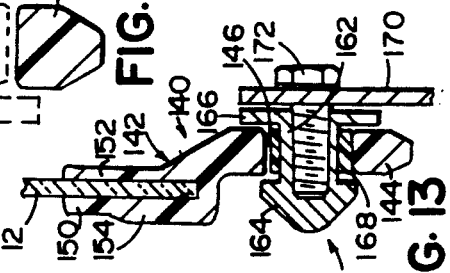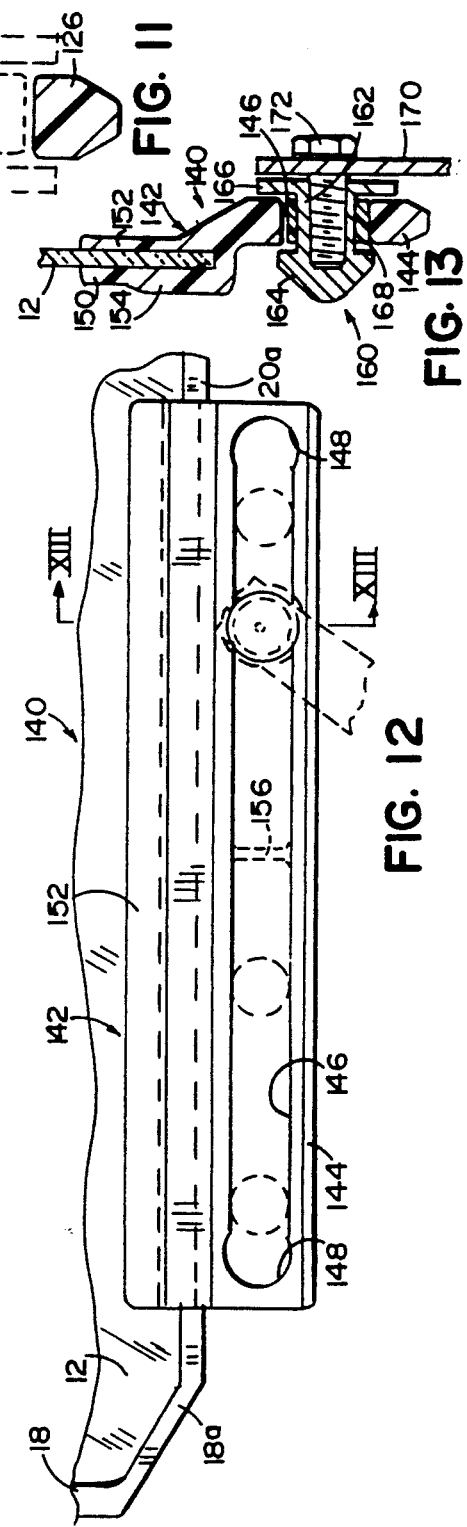

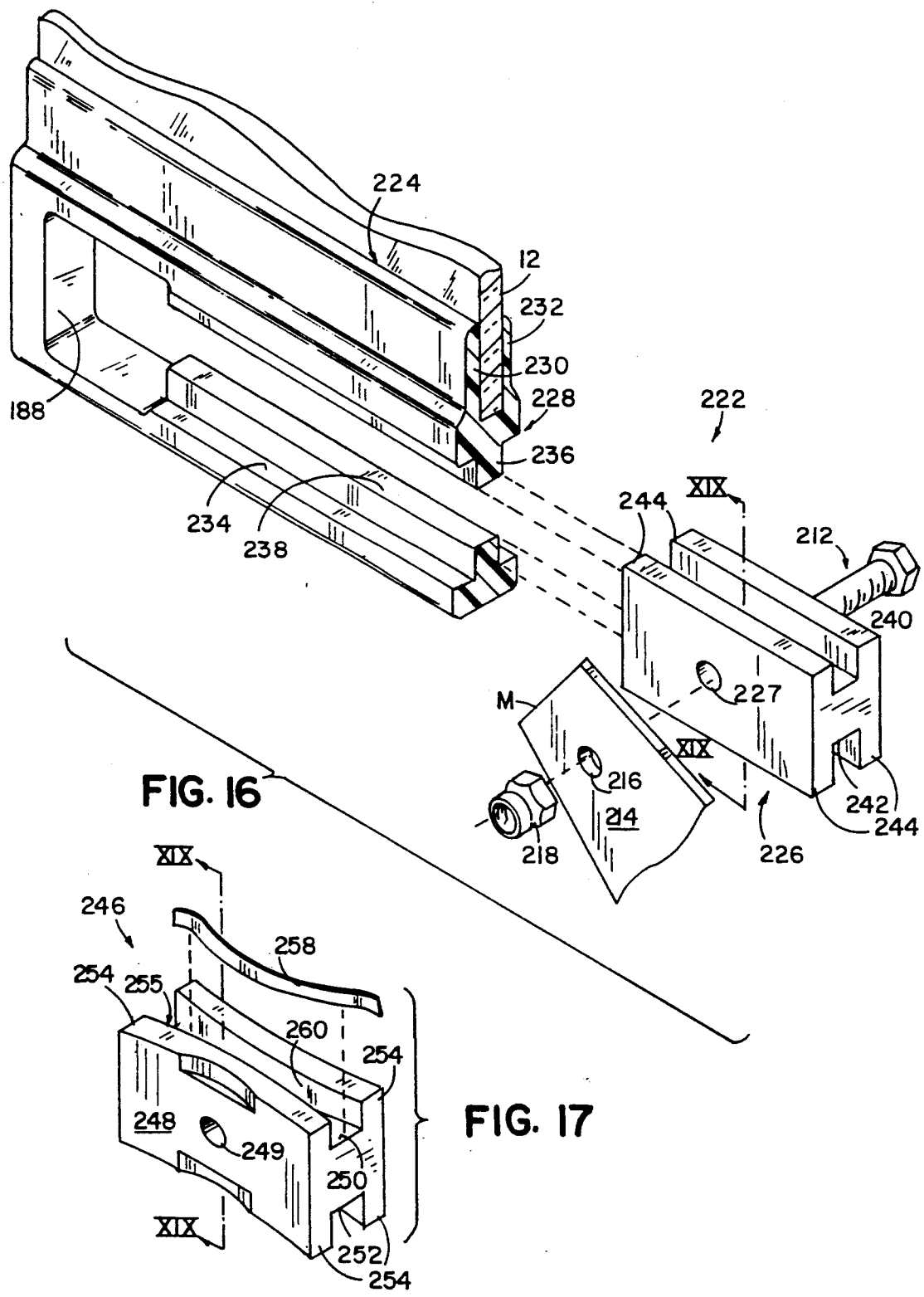

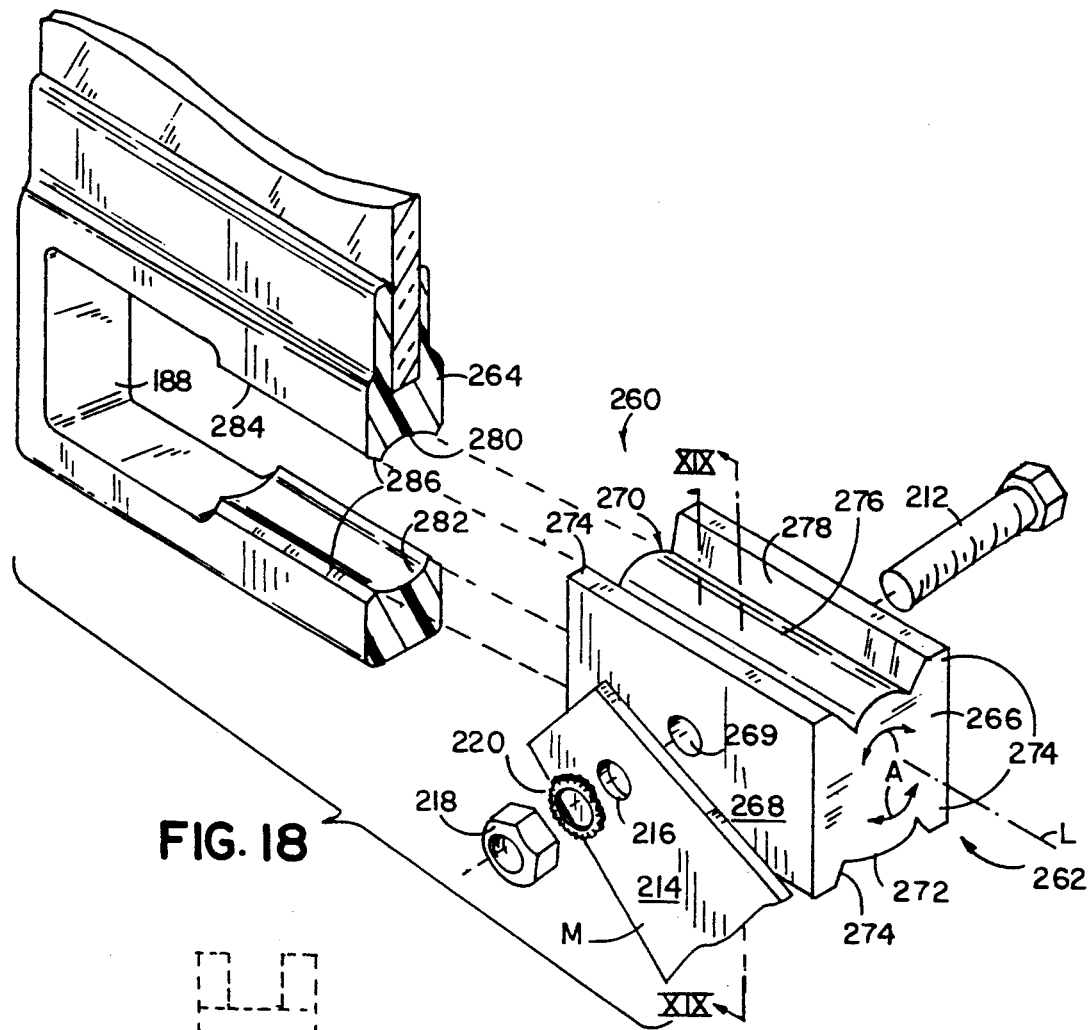
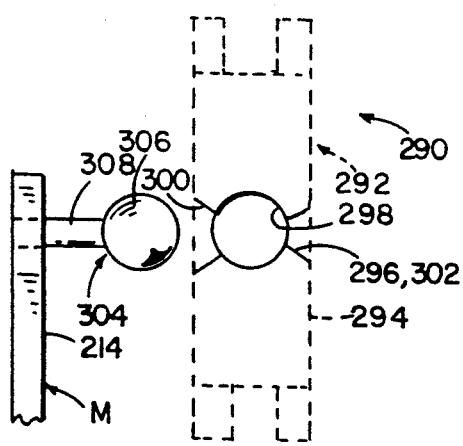
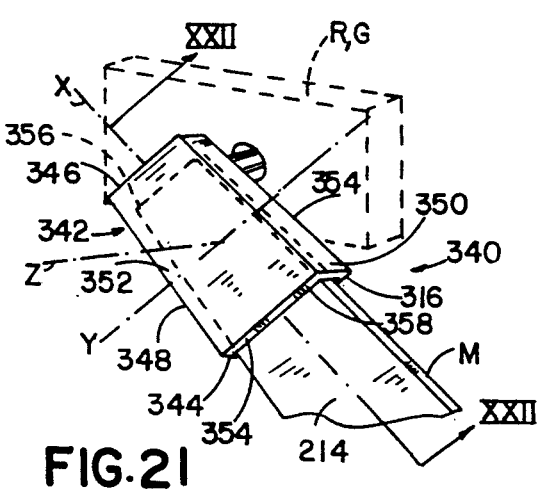

PANEL ASSEMBLY FOR VEHICLES WITH MOLDED REGULATOR ATTACHMENT

CROSS-REFERENCE TO RELATED APPLICATION

This application is a continuation-in-part of U.S. patent application Ser. No. 07/671,373, filed Mar. 19, 1991, now U.S. Pat. No. 5,065,545.

FIELD OF THE INVENTION

This invention relates to panel assemblies especially adapted for use as windows in vehicles or other structures where the window must be raised or lowered usually by sliding movement by means of a window regulator mechanism connected to the window assembly. More particularly, the invention is a window panel assembly providing one or more attachment members which are molded directly in place on a sheet of material for receiving a roller or glide assembly and coupled to a window regulator mechanism.

BACKGROUND OF THE INVENTION

In a typical vehicle, two or more side window panels are provided adjacent the driver and passenger which may be raised and lowered usually by sliding movement via hand operated or electrical mechanisms. The window panel assemblies are mounted in tracks or channels and are generally moved vertically. It is common to provide a metal bracket along the bottom edge of the window which allows for the attachment of a scissor-like linkage, gear driven regulator mechanism, tape or cable drive system all of which are generally known as window regulator mechanisms to move the window when desired. The prior known brackets have normally been rigidly attached to the sheet glass forming the window in various ways to provide a channel for receipt of rollers or other connections to the mechanisms.

Various drawbacks have been encountered in prior known window panel assemblies incorporating such brackets. First, metal brackets are expensive to manufacture and/or expensive to attach to the glass window panel without breakage. Generally, the metal brackets required additional labor and/or processing steps. In some cases, the metal brackets loosened after attachment or after installation in the vehicle causing malfunction of the window regulator mechanism and trapping the window either in an open or partially open position.

Secondly, the prior known metal brackets are difficult to consistently manufacture in closely fitted tolerances. Hence, the fit of the window regulator roller or other mechanism portion to the brackets varied within wide ranges. In some cases, the tolerance was sufficiently large to cause vibration or rattles between the regulator mechanism connection and the sheet creating annoyance and inconvenience to the vehicle owner.

Thirdly, the prior known metal brackets were often difficult to adapt to the position requirements of the window regulator rollers and other mechanism portions. The brackets often required sharp bends in the metal to locate the channel or other bracket portions appropriately for connection to the roller mechanisms. In addition, it was often necessary to preassemble portions of the regulator mechanism followed by further assembly steps after insertion in the bracket to enclose the rollers properly in position. Alternately, many roller assemblies had to be completely assembled within the metal brackets for proper installation.

All of the above problems added to the inconvenience and expense of providing proper mounting for window regulator mechanisms on sheet glass and other windows and panels in vehicles. The present invention was devised as a solution for these and other problems by providing a panel assembly including an attachment member molded directly on the glass or other sheet material of the sheet thereby eliminating the need for separate metal brackets and the above attendant problems. Moreover, the present invention provides a means for coupling the molded attachment member to existing window regulator mechanisms without significant modification.

SUMMARY OF THE INVENTION

Accordingly, the present invention provides a panel assembly especially adapted for use in vehicle windows including an attachment member molded directly on the sheet material of the assembly from a resinous material without requiring any fastening members to extend through the sheet. The panel is adapted for raising and lowering, typically by sliding movement, via one of several types of regulator mechanisms such as a scissor linkage, or the like, which may be conveniently assembled to the attachment member.

In one form, the invention is a panel assembly comprising a sheet of material, such as glass or the like, and at least one attachment member for connecting the sheet to a support such as a window regulator mechanism. The attachment member is molded directly on the peripheral edge of the sheet from a moldable, resinous material such that the member is securely adhered to the sheet during molding. The attachment member has securing flanges extending along both side surfaces of the sheet which encapsulate the peripheral sheet edge and an elongated slot extending along the length of the member for receiving a roller or glide assembly coupled to the window regulator mechanism. Access means are included for inserting the roller or glide assembly in the slot. The assembly allows a portion of the regulator mechanism to be supported on the attachment member for movement in the slot to move the panel assembly between desired positions.

In a preferred form of the invention, the attachment member may include an elongated, generally C-shaped channel portion with the slot comprising an elongated opening in one side of the channel. The opening communicates to the channel portion interior for receiving a roller or glide assembly coupled to the window regulator mechanism. In one form, the channel portion overlaps the peripheral sheet edge. Alternately, the C-shaped channel portion may be aligned with the peripheral edge of the sheet.

In another form of the invention, the attachment member may include an attachment flange extending outwardly of the peripheral sheet edge and a slot comprising an elongated opening having closed ends and extending entirely through the attachment flange enabling access thereto from either side of the assembly. Such opening is adapted to receive the roller or glide assembly attached to the window regulator mechanism. At least one of the closed ends of the elongated opening preferably includes an enlarged area adapted to receive the roller or glide assembly from the regulator mechanism prior to insertion into the elongated opening. In addition, depending on the length of the attachment member, a molded support may be included across the opening for additional strength. Moreover, the attachment member may be made rigid by the addition of a stiffener encased within the lower edge.

In either form of the invention, molded securing flanges extend toward the center of the sheet on the attachment member, at least one of which may include an area of increased thickness as compared to the remainder of either securing flange to enhance adherence of the molded attachment member to the sheet glass. In addition, with either form of the attachment member, a spaced pair of attachment members may be formed on one edge, typically the lower edge, of the panel in order to reduce material requirements based on the known paths of travel of the regulator mechanisms.

In yet other aspects of the invention, the attachment member or members may be molded integrally with gasket portions on other sheet edge portions of the assembly to provide guides for raising and lowering the window.

Preferably, the attachment members are formed on the sheet by molding with a resinous, polymeric molding material such as reaction injection molded polyurethane, the attachment members being adhered and bonded to the sheet by forming and curing within a mold apparatus.

In accordance with yet another form of the invention, the attachment members having an elongated slot extending entirely therethrough may be coupled to new or existing window regulator mechanisms by a glide means. The glide means includes a slide having a generally rectangular body containing an upper and a lower channel to receive the upper and lower surfaces of the slot in the attachment member. In a preferred embodiment, the slide body is pivotally coupled to an arm of the window regulator mechanism. The coupling provides a universal joint between the window and the window regulator mechanism. In another embodiment, the slide body is rigidly coupled to the arm of the window regulator mechanism. The upper and lower channels of the rigidly-fixed slide have convex floors and outwardly inclined walls so as to pivot about its longitudinal axis while in the elongated slot of the attachment member.

In still another embodiment of the invention, wherein the attachment member includes an elongated, generally C-shaped channel portion, the glide means coupling the attachment member to the window regulator mechanism includes a generally rectangular slide. The cross-sectional profile of the slide is substantially similar to that of the C-shaped channel and adapted to slide therein to move the window between the desired positions. The slide may be fastened to the arm of the window regulator mechanism by a suitable coupler such as that described above.

As will be understood from the invention, numerous advantages over prior known panel/window assemblies are provided by this invention. These include cost savings and manufacturing simplification by the elimination of prior known metal brackets due to the complete formation of necessary window regulator attachment members by molding. The molded attachment members provide significantly better manufacturing consistency and tolerance for fitting with rollers and other portions of the regulator mechanisms. The closer tolerance provided by the molded attachment members eliminates vibration and rattles encountered in prior known assemblies, the molded attachment members also enable easier attachment and installation of the regulator mechanisms, and provide a greater ability to properly position the attachment members for connection to the regulator mechanism in the vehicle itself. Further, the molded attachment members eliminate the need for multiple, preformed, separate elements which must be joined together. Moreover, the molded attachment members are durable and non-corrosive and well adapted for use in the often harsh environments encountered during vehicular use in varying climates. Yet another advantage of the instant invention is the ability to place the window panel assembly in existing vehicles using the new coupler for attaching the window panel to existing window regulator mechanisms.

The glide assemblies used with the attachment members and panel assemblies may be used with existing or new window regulator mechanisms. In particular, the glide assemblies provide a pivotal coupling with limited freedom and may be used with curved windows or panel assemblies which must rotate or move with respect to the window regulator mechanism as they are moved from the open to the closed position. The glide assemblies may also be used with windows or panel assemblies which move out and become flush with the vehicle body. The glide assemblies may be inserted into the attachment members before the pane or window assembly is inserted in the vehicle door enabling easier attachment and installation of the regulator mechanisms, and a greater ability to properly position the attachment members for connection to the window regulator mechanism. The glide assembly may be preassembled with the panel and shipped as a single unit, reducing the need to assemble many separate parts. The slide is durable and inexpensive and easy to manufacture.

These and other objects, advantages, purposes and features of the invention will become more apparent from a study of the following description taken in conjunction with the drawings.

BRIEF DESCRIPTION OF THE DRAWINGS

FIG. 10 is an enlarged, fragmentary, plan view of the bottom portion of a sixth embodiment of the window panel assembly of the present invention;

FIG. 11 is a sectional view of the window panel assembly of FIG. 10 taken along plane XI—XI;

FIG. 12 is an enlarged, fragmentary, plan view of the bottom portion of a seventh embodiment of the window panel assembly of the present invention;

FIG. 13 is a sectional view of the window panel assembly of FIG. 12 taken along plane XIII—XIII;

FIG. 16 is an alternate embodiment of a glide assembly and attachment member;

FIG. 17 is another alternate embodiment of the glide assembly of FIG. 16;

FIG. 18 is yet another alternate embodiment of a glide and attachment member;

FIG. 19 is a sectional view of the glide assembly of FIGS. 15-17 along plane XIX—XIX illustrating one embodiment of a coupling between the glide and the window regulator mechanism;

FIG. 21 is an perspective view of a cap used to interconnect a roller or glide assembly to the end of the window regulator mechanism;

DESCRIPTION OF THE PREFERRED EMBODIMENTS

Figure 1:
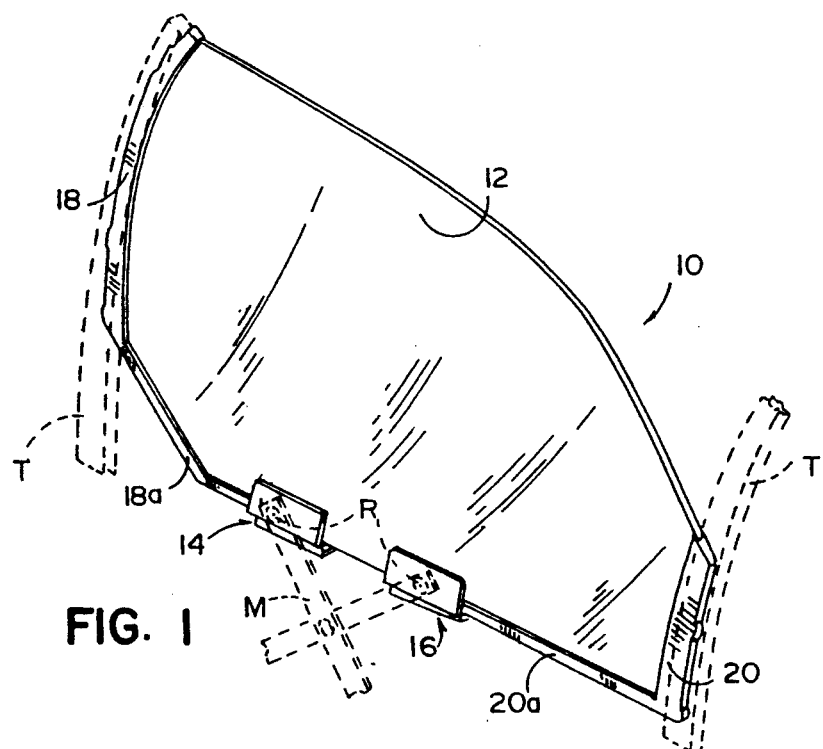
FIG. 1 is a perspective view of a window panel assembly of the present invention incorporating a molded attachment member having a slot adapted to receive a scissor-type regulator mechanism for raising and lowering the window and also generally illustrating the tracks for guiding the sliding movement of the window panel assembly.
Figure 2:
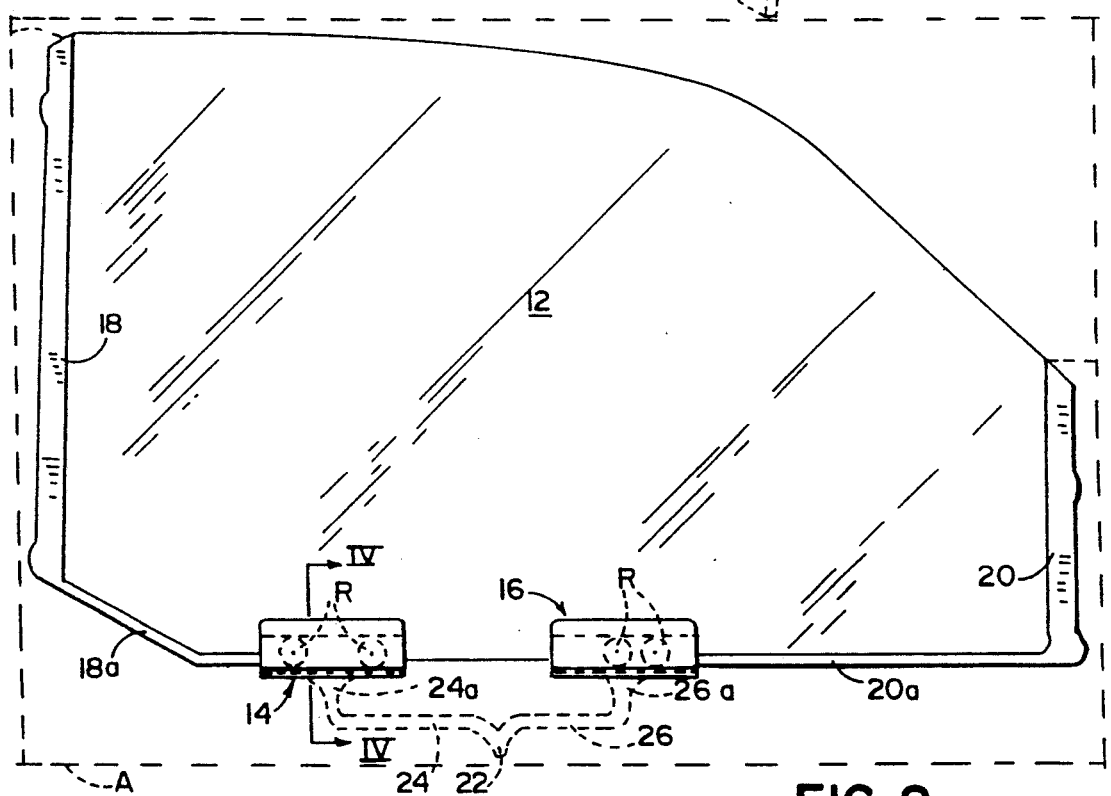
FIG. 2 is a plan view of the window panel assembly shown in FIG. 1 and also illustrating a portion of a suitable mold apparatus used to form the attachment members and gasket the transparent sheet material to form the assembly.

Referring now to the drawings in greater detail, FIGS. 1 and 2 illustrate a first embodiment 10 of the window panel assembly of the present invention. Assembly 10 is specifically adapted for use as a vehicle window and includes a configured, preferably curved sheet 12 of transparent glass which may be tempered, laminated or otherwise strengthened with conventional principles and also includes two spaced attachment members 14, 16 and a pair of spaced, peripheral edge gasket or casing portions 18, 20. Preferably, attachment members 14, 16 and gasket or casing portions 18, 20 are all simultaneously formed directly on the sheet glass 12 in a molding apparatus into which sheet 12 is inserted from a resinous plastic or polymeric molding material, preferably reaction injection molded polyurethane, or polyvinyl chloride, of sufficient strength, rigidity and hardness to withstand operation of the window and regulator mechanism. Attachment members 14, 16 are adapted to receive therein the rollers from a scissor-type window regulator or raising and lowering mechanism M shown in phantom in FIG. 1. Spaced gasket portions 18, 20 may also be formed on other peripheral edge portions such as the vertical rear edge of the window and the vertical forward edge of the window. Rear and front edge gasket portions 18, 20 are adapted to be received in tracks or channels T shown in phantom in FIG. 1, which tracks are usually fitted in the doors of a vehicle to guide the substantially vertical movement of the window assembly.

Figure 3:
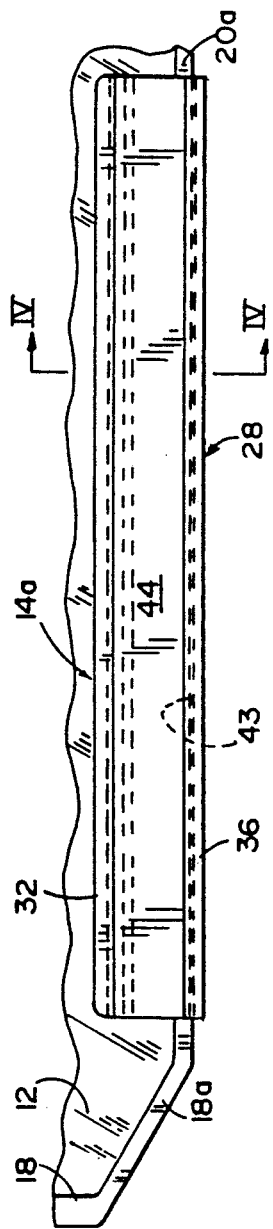
FIG. 3 is an enlarged, fragmentary, plan view of the bottom portion of a second embodiment of the window panel assembly of the present invention.

With reference to FIGS. 2 and 3, the lower half of a suitable mold apparatus A is shown in phantom including representative runners or channels 22, 24, 26 through which mold materials such as polymeric reaction injection molded (RIM) polyurethane components, which have been previously mixed together with an aftermixer device, or polyvinyl chloride materials, are injected into suitable mold cavities to form attachment members 14, 16, as well as gasket or casing portions 18, 20, on the transparent sheet 12 which is simultaneously held within the mold half. The channels or runners include a main runner 22 leading to a bifurcated channel 24, 26 having fan-shaped exit portions 24a, 26a adapted to introduce molding material into a first cavity which forms gasket portion 18 and connecting portion 18a, as well as a second cavity for gasket portion 20 and connecting portion 20a. Connecting portions 18a, 20a extend from opposite ends of attachment members 14, 16. The cavity which forms attachment member 14 acts as a connection chamber leading to the smaller cavity forming connection portion 18a which is adhered to the lower edge of sheet 12 and which, in turn, leads to the cavity forming gasket portion 18. Likewise, the cavity which forms attachment member 16 acts as a connection chamber leading to the smaller cavity forming connection portion 20a which extends along another portion of the lower edge of sheet 12 and, in turn, leads to the cavity forming gasket portion 20. In the preferred embodiment, attachment members 14, 16 are not joined by any molded portion or the like. However, a variant of the window assembly could be formed by using either runner 24 or 26 alone and having a connection portion intermediate the attachment members 14, 16 such that only a single exit portion or runner could be used to fill the entire cavity along the entire length of the sheet edge to be encapsulated.

Prior to injecting polymeric material through runners 22, 24 and 26, a sheet 12 of transparent material, preferably glass, is placed within the recess in mold half A such that the edges of the sheet project into the mold cavities adapted to form the attachment members 14, 16, connecting portions 18a, 20a, and gaskets 18 and 20. Prior to such insertion, sheet 12 is preferably coated on the edges which will receive the attachment members, connecting portions and gaskets with a suitable conventionally known primer coating which enhances the adherence or bond between the polymeric material and the glass surfaces during molding. Thereafter, the desired polymeric material is injected through the runners or channels 22, 24 and 26 such that the mold cavities are filled. As will be understood from FIG. 4, attachment members 14, 16 include a section which envelopes and encapsulates the edge of glass sheet 12. After the polymeric material cures and/or sets up within the mold, the formed window panel assembly, including attachment members 14, 16, connecting portions 18a, 20a, and gasket portions 18, 20, is removed from the mold once the top half of the mold apparatus is withdrawn. As is conventionally known in the molding art, appropriate seals may be included in the upper and lower mold halves to close off cavities forming these molded portions within the mold to prevent the escape of molding material onto the center portions of glass sheet 12 and from the mold apparatus overall during the molding process.

Although the use of plastic or polymeric molding materials such as reaction injected molded (RIM) polyurethane is preferred, polyvinyl chloride could alternately be used for the attachment members, connecting portions and gasket members if made sufficiently rigid to support the window regulator mechanism rollers and such that gasket portions 18, 20 which slide in guide tracks T are also sufficiently rigid. A suitable primer to be applied to glass sheet 12 before molding of these portions from the reaction injection molded polyurethane may be obtained from Lord Corporation of Erie, Pa., under the product designation Chemlook AP-134. In addition, it is possible that other polymeric and/or moldable materials may be used to form these molded portions and that other transparent sheetings such as acrylic or other plastic materials may be used instead of glass depending on the desired window application. Of course, glass coated with an opaque or translucent frit layer or other opaque or translucent sheet materials may be substituted for the transparent glass or plastic sheeting of assembly 10 to produce other panel assemblies within the scope of this invention.

Figure 4:
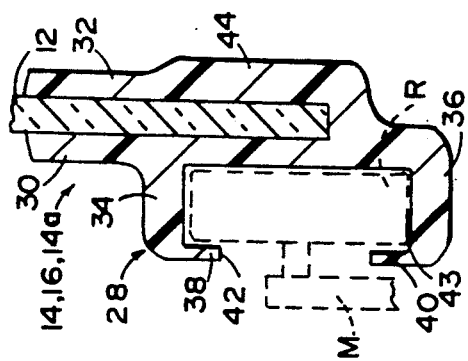
FIG. 4 is a sectional view of the window panel assemblies of FIGS. 2 and 3 taken along plane IV—IV in each figure, and also illustrating a roller from a scissor-type window regulator mechanism.

Referring now to FIGS. 1, 2 and 4, each of the spaced attachment members 14, 16 includes a generally C-shaped channel portion 28 and securing flanges 30, 32 which envelope and encapsulate the edge and adjacent periphery of glass sheet 12 at the location of the attaching member. Molded securing flanges 30, 32 extend inwardly toward the center of sheet 12 along the sheet side surfaces from the peripheral edge. Securing flange 30 forms one sidewall of the channel portion 28 which overlaps the peripheral edge of sheet 12, as shown in FIG. 4. Channel portion 28 also includes a top wall 34, bottom wall 36 and retaining flanges 38, 40 which define an elongated interior channel 43. Flanges 38, 40 are in alignment and extend toward one another to define an elongated, side opening 42 which is opposed to the closed side of channel portion 43 formed by securing flange 30. Bottom wall 36 merges into the lower portion of securing flange 32 thereby enclosing the peripheral edge of the sheet. Along one portion of securing flange 32 adjacent the periphery of the sheet is formed in elongated area 44 having an increased thickness as compared to the remainder of the securing flange 32 or the other securing flange 30. Increased thickness area 44 provides enhanced adherence of the molded material to glass sheet 12 by providing a higher curing heat for the primer thereby producing better overall adhesion strength for the mold material to the glass after molding.

As is best seen in FIG. 4, elongated channel 43 is also elongated in the height dimension. The ends of channel portion 43 are open for access to and insertion of a suitable roller from the window regulator mechanism M, as shown in FIG. 4. Although confining members may be inserted in the ends of the channel after insertion of the roller therethrough, they are not typically needed because the entire assembly 10 is confined in tracks T in the vehicle and mechanism M prevents removal of the rollers. The molded RIM polyurethane material is of sufficient strength to support roller R on bottom wall 36 without deflection in order to raise and lower window assembly 10 in a sliding movement along tracks T, as shown in FIG. 1. Approximately one-half of the height of channel 43 lies inside or toward the center of sheet 12 from its peripheral edge. The remaining half projects outwardly of the peripheral edge thereby providing the overlapping position of the channel with respect to the edge. Such position helps provide additional support for channel portion 28 by means of rigid sheet glass 12 acting as a backup support for the channel. As is also apparent from FIGS. 1, 2 and 4, channel portion 43 in each of the attaching members is generally rectilinear as is the lower edge of sheet 12 in the preferred embodiment. Preferably, attaching members 14, 16 are molded on sheet 12 such that opening 42 and channels 43 extend generally parallel to the lower edge, as shown in FIG. 2. It is within the scope of the present invention, however, to provide other than rectilinear channels depending on the motion to be provided for assembly 10. In this respect, molding a curved channel in each of the attaching members may cause the window assembly to tip or rotate in a fore and aft direction as it is being raised or lowered, or be moved at other than a constant rate within different portions of the tracks T. The molding process for attachment members 14, 16 is uniquely adapted to provide different configurations while maintaining the close tolerance necessary for precision fitting of window regulator mechanism to the window assemblies.

As shown in FIG. 2, when rollers R from opposite portions of scissor-type window regulator mechanism M (FIG. 1) are received in channels 43 of spaced attachment member 14, 16, the bar members upon which rollers R are mounted may be pivoted by an appropriate manual or power mechanism about the center pivot to raise or lower window assembly 10. Based on the connection point and positioning of the regulator mechanism, the rollers will travel different distances along channel portions 43 during such motion. The limits of travel for the rollers in a typical scissor-type window regulator mechanism M are shown in phantom in FIG. 2. As is apparent, neither roller approaches the extreme end of attachment member 14, 16. In addition, the area between attachment members 14, 16 is not required as a track or channel portion for receipt of the rollers during normal motion. Hence, by eliminating the center section between members 14, 16, material is saved and the overall cost of the assembly is lowered.

Alternately, however, a single continuous attachment member 14A may be used in the assembly as is shown in FIG. 3 where like numerals indicate like parts to those in attachment members 14, 16. In member 14A, which has the same shape in section as members 14, 16, the same top, bottom and sidewalls are provided adjacent the periphery of sheet 12 but in a longer, more extended length. Likewise, securing flanges 30, 32 are included along with increased thickness area 44 to provide enhanced adherence. In this form, only a single channel or runner 24 or 26 is required to fill the cavity in the mold forming member 14A, which cavity in turn leads to the connecting portions 18A, 20A and to gaskets 18, 20, respectively. As with each of the attaching members 14, 16, the ends of channel portion 43 are open allowing insertion of rollers R. As above, channel 43 overlaps the peripheral edge of sheet 12. The center section of attaching member A (not present in assembly 10 which uses separate attaching members 14, 16) also helps to increase the adhering strength of the channel portion to the glass to ensure retention of the window regulator mechanism to the window glass throughout the life of the vehicle in which it is installed.

Figure 6:
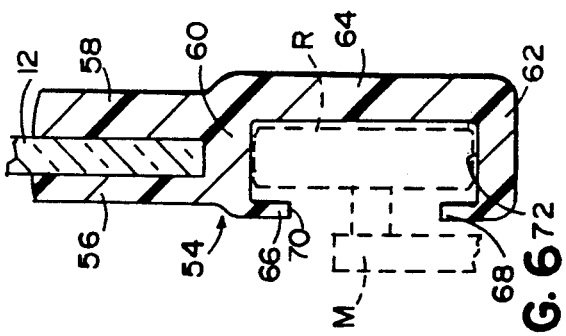
FIG. 6 is a sectional view of the window panel assembly taken along plane VI—VI of FIG. 5 and also illustrating a roller from a scissor-type window regulator mechanism.
Figure 5:
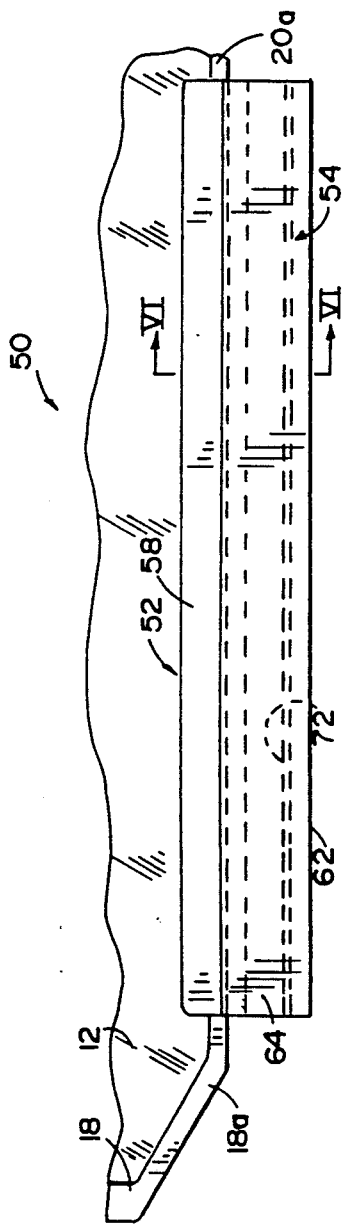
FIG. 5 is an enlarged, fragmentary, plan view of the bottom portion of a third embodiment of the window panel of the present invention.

With reference to FIGS. 5 and 6, a third embodiment 50 of the window panel assembly is shown including a single, elongated attachment member 52 molded directly on the lower edge of a sheet 12 of transparent glass as in embodiments 10 and 14A. In embodiment 50, attaching member 52 includes a channel portion 54 and a pair of securing flanges 56, 58 which envelope and encapsulate the periphery and edge of a lower portion of sheet 12, as shown in FIG. 6. Instead of channel portion 54 overlapping a portion of the side surface of sheet 12, as in attaching members 14, 16 and 14A, channel portion 54 is generally aligned with the edge of sheet 12 in the general plane of the sheet material. As above, channel portion 54 includes top wall 60, bottom wall 62, closed sidewall 64 and retaining flanges 66, 68 which extend toward one another to define opening 70 leading to interior channel 72 defined by the top, bottom and sidewalls. As with channel portion 28 and attaching members 14, 16 and 14A, the ends of channel portion 54 are open to allow insertion of roller R which again, is vertically elongated as well as being elongated in the lengthwise direction and generally parallel to rectilinear lower glass edge 12. Opening 70 extends generally parallel to channel 72, as well as to the edge of glass 12, as shown. In order to enhance adherence of attachment member 52 to glass 12, at least one of the securing flanges, in this case flange 58, has a thickness which is increased with respect to the thickness of the other securing flange 56 in order to provide increased curing heat for the primer applied under the molding material thereby enhancing overall adhesion strength for the gasket to glass after molding.

Figure 9:
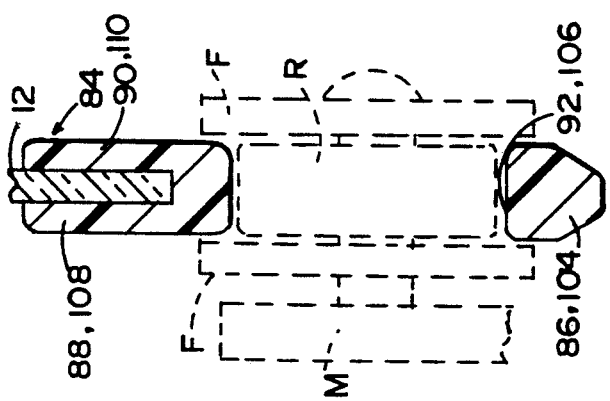
FIG. 9 is a sectional view of the window panel assemblies of FIGS. 7 and 8 taken along plane IX—IX in each figure.
Figure 7:
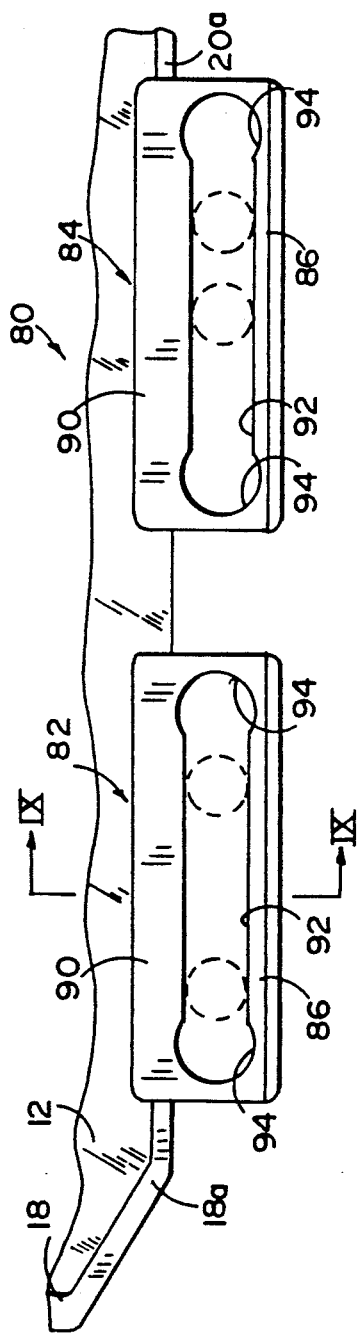
FIG. 7 is an enlarged, fragmentary, plan view of the bottom portion of a fourth embodiment of the window panel assembly of the present invention.

As shown in FIGS. 7 and 9, the fourth embodiment 80 of the window panel assembly incorporating modified attachment members 82, 84 is illustrated. As in embodiment 10, attachment members 82, 84 are spaced apart along the lower edge of sheet 12 and are each adapted to receive one of the rollers from the window regulator mechanism. Each attachment member 82, 84 includes an attachment flange 86 projecting outwardly away from the peripheral edge of sheet 12 and a pair of molded, securing flanges 88, 90 which extend over the side surfaces of glass sheet adjacent its edge toward the center of the sheet to envelope and encapsulate the peripheral edge in the location of the attachment member. Securing flanges 88, 90 may be increased in thickness to enhance the curing heat for the molding material to enhance adhesion strength. Each of the attachment flanges 86 include an elongated opening 92 extending entirely through the flange for receipt of and access by a roller mechanism from a window regulator from either side thereof. Opening 92 is elongated in the lengthwise direction, is rectilinear, and generally extends parallel to the edge of glass 12. At either end of each elongated opening 92 are enlarged, circular areas 94 which allow the retaining F flanges adjacent either side of the roller R in window regulator mechanism M to be pushed through the opening followed by rolling the roller along the length of opening 92 into position. Such insertion of the roller mechanism after assembly avoids the necessity of having to assemble the roller in the slot or opening 92 and saves considerable installation time. As with attachment members 14, 16, members 82, 84 are each preferably molded from RIM polyurethane material and form connecting cavities extending to connecting portions 18a, 20a and gasket portions 18, 20, as described above. The typical extremes of the paths of travel of the rollers in window regulator mechanism M are shown in phantom in FIG. 7 for this embodiment.

Figure 8:
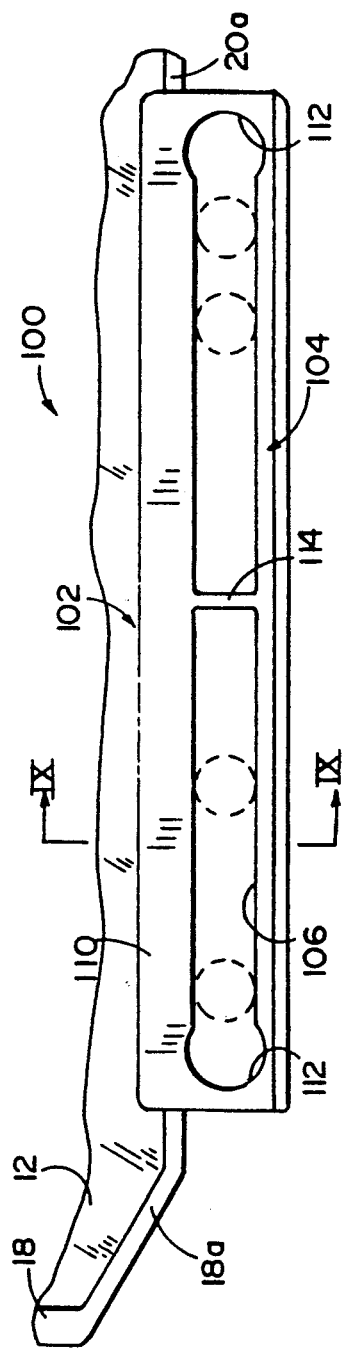
FIG. 8 is an enlarged, fragmentary, plan view of the bottom portion of a fifth embodiment of the window panel assembly of the present invention.

With reference to FIG. 8, an additional embodiment 100 of the window panel assembly is shown including a one-piece attachment member 102 having a cross section substantially similar to that of either attachment member 82 or 84, as shown in FIG. 9. As with attachment members 82, 84, member 102 includes an attachment flange 104 in which is formed an elongated slot or opening 106 extending entirely through flange 104. Member 102 is secured to the lower edge of glass sheet 12 by means of securing flanges 108, 110 which are substantially similar to flanges 88, 90 and may have an increased thickness to enhance adhesion strength, as described above. Each of the closed ends of opening 106 includes an enlarged circular area 112 similar to area 94 to allow insertion of the roller assembly R without prior disassembly, as described above.

Because of the overall length of opening 106 in attachment member 102, and to safeguard against deflection of the lower surface of opening 106 when engaged by either of the roller assemblies from the window regulator mechanism, an integrally molded support or connector 114 may optionally be formed extending across the opening 106 generally perpendicular to the extent of the opening to connect the upper and lower areas of the attachment flange 104. Inclusion of support 114 depends on the length of opening 106 and the resiliency of the molding material from which attachment member 102 is formed. As described above, the normal range of motion for either roller in window regulator assembly M is generally toward either closed end of opening 106, as shown in phantom in FIG. 8. Hence, support connector 114 is formed generally in the center of opening 106 intermediate the closed ends thereof in a position which does not interfere with the range of travel of the rollers in mechanism M. As above, attachment member 102 may be molded from RIM polyurethane or other polymeric materials and is formed by a cavity which leads to connecting portions 18a, 20a and gaskets 18, 20 in the manner described above.

Two additional embodiments of the window panel assembly including attachment members similar to members 82, 84 and 102 are shown in FIGS. 10–13 but including attachment flanges which are offset from the general plane of the glass sheet 12. In embodiment 120, shown in FIGS. 10 and 11, a pair of spaced attachment members 122, 124 are molded directly on the lower edge of sheet glass 12. Each attachment member includes an attachment flange 126 including an elongated opening 128 having enlarged circular ends 130, as well as a pair of securing flanges 132, 134, on opposite sides of the glass sheet periphery. At least one of the securing flanges such as flange 134 includes an elongated area 136 of increased thickness to increase adhesion strength, as described above. As shown in FIG. 11, attachment flange 126 is offset from the plane of sheet 12 toward securing flange 132 in order to provide better positioning for receipt of roller R of window regulator mechanism M. As with embodiments 80 and 100, enlarged openings 130 are adapted to receive roller assembly R without disassembly prior to movement of the roller into opening 128 thereby decreasing assembly time.

A one-piece version of embodiment 120 is shown at 140 in FIGS. 12 and 13. In this embodiment, a one-piece attachment member 142 is molded directly on the lower edge of glass sheet 12 as with embodiments 14A, 50 and 100. As with embodiment 120, attachment member 142 includes an attachment flange 144 which is offset from the general plane of sheet 12, as shown in FIG. 13. Flange 144 includes an elongated opening 146 having enlarged circular ends 148 for receipt of roller mechanisms without disassembly and a pair of inwardly extending securing flanges 150, 152. At least one of the securing flanges, in this case flange 150, includes an elongated area 154 having an increased thickness to enhance adhesion strength. As in embodiment 100, a connecting support 156 may be included in the center of opening 146 to connect the upper and lower portions of attachment flange 144 for additional support depending on the overall length of the opening 146 and the stiffness an resiliency of the molding material from which attachment member 142 is formed to support the roller mechanisms. As above, support 156 does not interfere with the normal range of travel of the rollers in opening 146 which is shown by the positions of the rollers in phantom at either end of the opening in FIG. 12.

As shown in FIG. 13, one form of a roller assembly 160 on a regulator mechanism is shown and is especially useful with the elongated openings 92, 106, 128 and 146 of embodiments 80, 100, 120 and 140. Roller assembly 160 includes a cylindrical support 162 formed integrally with an enlarged head 164 on one end and a planar, circular washer or flange 166 on the opposite end. Head 164 and flange 166 confine a polymeric plastic bushing 168 which is rotatably fitted around the cylindrical, circumferential surface of support 162 for engagement with the lower surface of opening 146 in attachment member 142. Support 162 is threadedly secured to a support/mounting bar 170 by means of a headed securing bolt 172. In the present invention, roller assembly 160 may be assembled prior to insertion in elongated opening 146 followed by bushing the conically shaped head 164 through one or the other of openings 148 at either end of opening 146 until bushing 168 is aligned with the top and bottom surfaces of opening 146 and thereafter moved into the main portion of opening 146 intermediate openings 148.

In each of the embodiments of the molded attachment members, the openings for receiving the window regulator mechanisms have been described as being substantially rectilinear. However, it is within the scope of the present invention to form the channel portions of the openings in any of the embodiments in a curved form to change the rate or the direction of motion of the window assembly as it is being raised and lowered. In addition, the shape of the channels or openings can be changed to accommodate desired rollers or other mechanisms by adjusting the shape and dimension of the mold cavities. Also, for embodiments 10, 80 and 120, it would be possible to combine different attachment members on one window assembly, such as members 14 and 84 or 124. Also, for members 14, 16, the openings 42 can face in opposite direction if desired.

Figure 14:
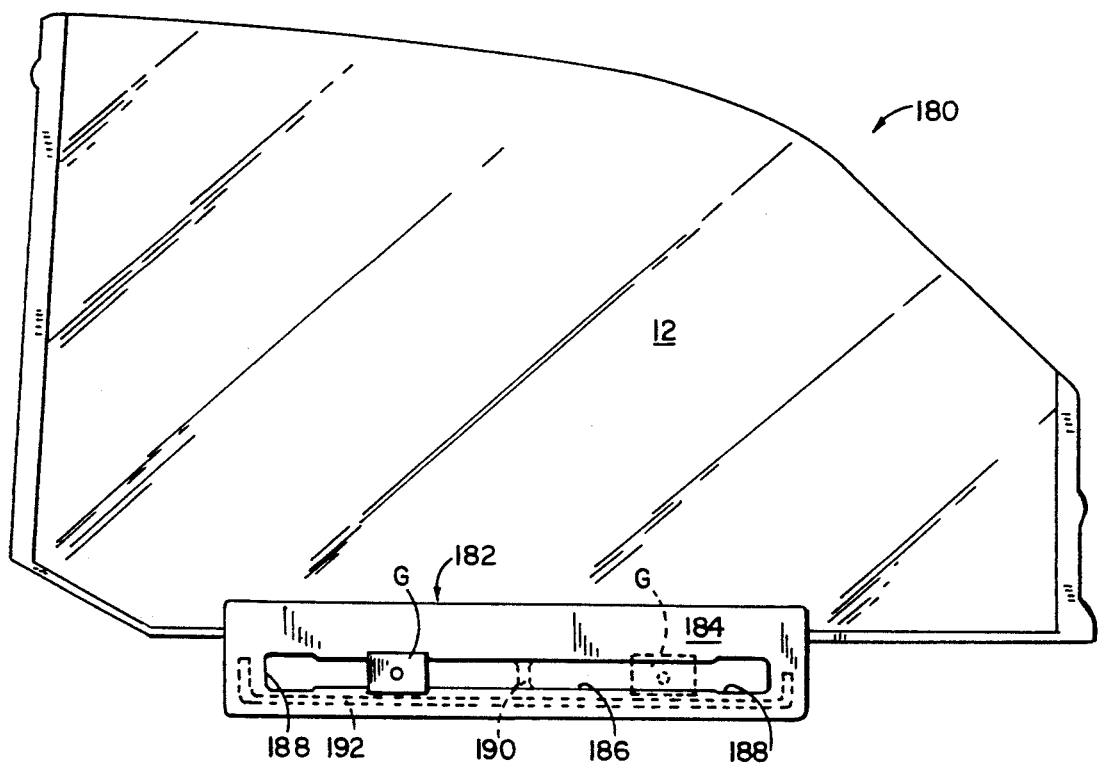
FIG. 14 is a plan view of an eighth embodiment of the window panel assembly having a one-piece attachment member suitable for receiving a glide member therein.

FIG. 14 illustrates another window assembly panel 180 having a molded, elongated attachment member 182. In FIG. 14, attachment member 182 includes an attachment flange 184 in which is formed an elongated slot or opening 186 extending entirely through flange 184. Member 182 is secured to the lower edge of glass sheet 12 by means of securing flanges substantially similar to flanges 88, 90 described above with reference to FIG. 9. Each of the enclosed ends of opening 186 includes an enlarged rectangular opening area 188 to receive a glide assembly G in a similar fashion to that described above in relation to rollers R in FIG. 8.

To prevent deflection of the lower surface of opening 186 when a downward force is applied by glide assembly G, opening 186 may have an integrally molded support or connector 190 generally perpendicular to the opening and connecting the upper and lower areas of attachment flange 184. In the alternative, the lower portion of attachment flange 184, below opening 186, may have a rigid member or stiffener 192 which extends substantially along the length of the attachment member and slightly beyond end 188 of opening 186. Rigid member 192 may be molded within the attachment member having its ends bent upward and around ends 188 of opening 186 in attachment member 182 to provide additional strength. Rigid member 192 may be a bar or rod made from a variety of materials such as steel, aluminum or some types of plastic.

Figure 15:
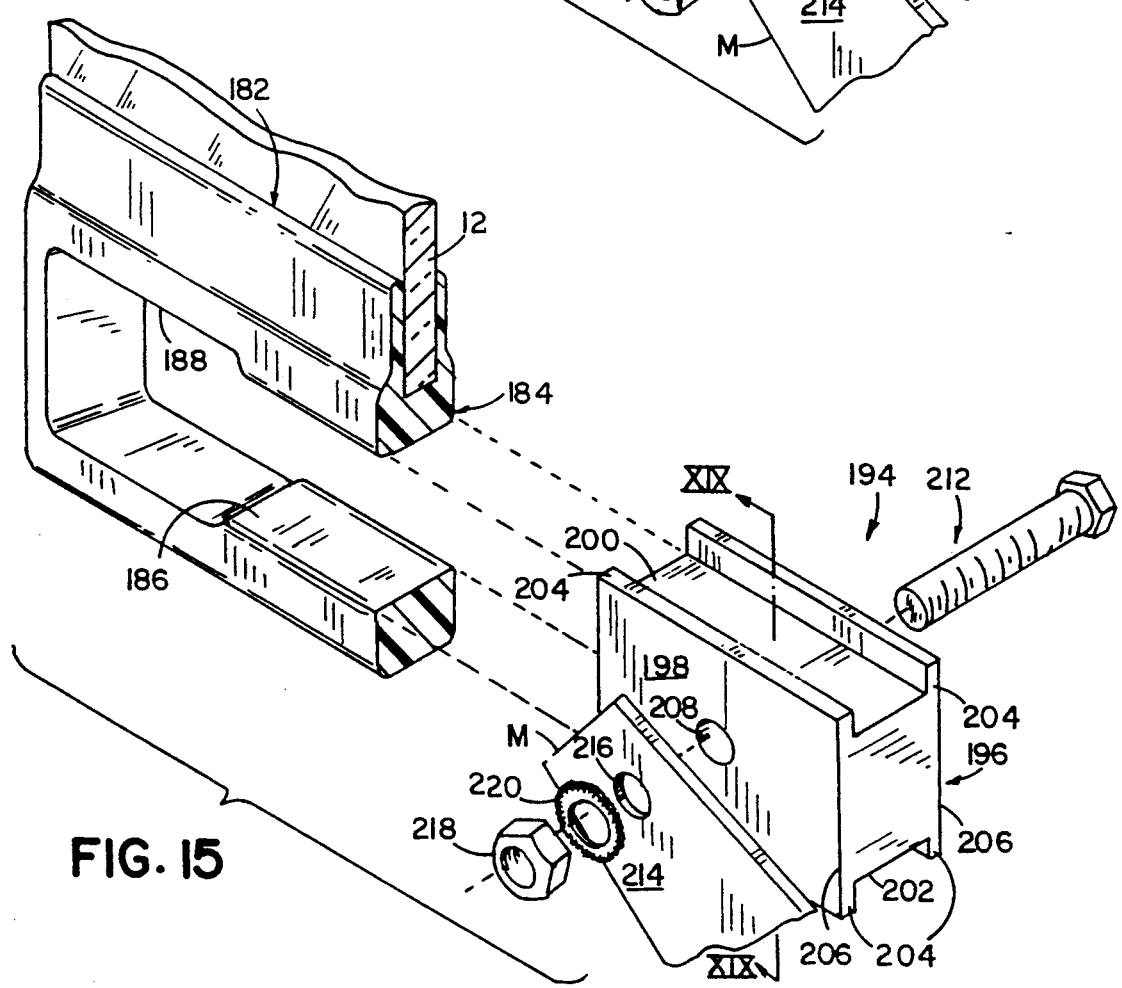
FIG. 15 is an perspective, exploded, fragmentary view of a glide assembly for use with the attachment members shown in FIGS. 7-14.

As shown in FIG. 15, a glide assembly 194 may be used with attachment member 182. Glide assembly 194 includes a slide 196 having a solid, generally rectangular body 198 including an upper channel 200 and a lower channel 202 defined by flanges 204 extending outwardly and substantially parallel with sides 206 of the slide. Slide body 198 has a hole 208 extending therethrough along the shortest dimension to receive a fastener such as bolt or screw 212 which can be secured in a hole 216 in an arm 214 of window regulator mechanism M by a nut 218 and washer 220. In the alternative, bolt or screw 212 may be received by threads in hole 216. In one embodiment, the width of upper and lower channel 200, 202 is slightly larger than the width of elongate opening 186. With slide 196 in opening 186, flanges 204 of the slide engage the sides of attachment flange 184 to retain the slide within opening 186. The extremes of the travel paths of each slide 196 would be similar to those shown in phantom in FIGS. 7 and 8.

FIG. 16 is an alternate embodiment 222 of glide assembly 194 shown in FIG. 15. In FIG. 16 a molded attachment member 224 is substantially similar to that described in reference to FIGS. 7-12. Attachment member 224 is molded along the lower edge of sheet 12 and is adapted to receive at least one slide 226. Attachment member 224 includes an attachment flange 228 projecting outwardly away from the peripheral edge of sheet 12 and a pair of molded, securing flanges 230, 232 which extend over the side surfaces of glass sheet 12 adjacent its edge and toward the center of the sheet to envelope and encapsulate the peripheral edge in the location of the attachment member. Attachment flange 228 includes an elongate opening 234 extending entirely therethrough to receive slide 226. Just as in FIGS. 7-9, opening 234 is elongated in a lengthwise direction of attachment member 224, is rectilinear, and generally extends parallel to the edge of glass sheet 12. Instead of the enlarged circular openings 94 located at both ends of opening 94, 106 as shown in FIGS. 7-8, a rectangular opening 188 is located at one or both ends of opening 234 in which to receive the generally rectangular body of slide 226, as shown in FIGS. 14 and 16.

As illustrated in FIG. 16, opening 234 has an upper and a lower flange 236, 238 extending from opening 234 inwardly along a centerline of the opening to define a central rail or track. Slide 226 disposed therein has an aperture 227 for receiving a fastener bolt 212 like that described above for securing regulator mechanism arm 214 thereto. Slide 226 also has an upper and a lower channel 240, 242 slightly wider than the upper and lower flange 236, 238 so as to glide thereon without binding. Flanges 244 on each side of channels 240, 242 nest along the exterior sides of upper and lower flanges 236, 238 and within elongate opening 234 so as not to project out of that opening thereby avoiding interference with any structure adjacent the window.

FIG. 17 illustrates another embodiment 246 of a glide or slide of the present invention. Slide 246 has a generally rectangular body 248 having securing aperture 249 and upper and lower channels 250, 252 defined by outwardly extending, parallel flanges 254. To provide lateral centering of slide 246 within the opening, each flange may be bowed inward so that convex surface 255 of each flange engages the attachment member to center the slide. As an alternative to bowed flanges 254, a leaf spring 258, with its convex surface bowed inwardly, may be located along channel wall 260 of each flange 254 to center slide 246. If vertical centering is desired, a similar leaf spring may be disposed at the bottom of each channel and fixed therein so that the convex surface of the spring engages the surface of attachment flange 228, or flanges 236, 238 thereon.

In each of the glide assemblies described above, one mechanism for fastening the slide to the arm of window regulator mechanism M included a bolt or screw secured by threads in the arm or by a nut and lock washer. Depending upon the vehicle design, the up and down movement of the window/panel assembly may involve considerable rotation about an axis perpendicular to the length of the bolt, i.e., for curved windows or those windows whose tracks move them outwardly to a position mounted flush with the vehicle body. Considerable clearance may be required between the bolt shank and the hole in the slide body to allow up to as much as 25° of rotation perpendicular to the length of the bolt or screw. The rotational freedom may be necessary to accommodate the up and down movement of window assembly 10. Although not shown in the figure, the rotational movement between the bolt and the slide body may also be provided by enlarging the hole in the slide in the appropriate direction of rotation. However, such clearances may become excessive and result in a loose connection and vibration. Moreover, the loose coupling may increase wear on the bolt and increase the chance of failure in the coupling, causing the window panel assembly to remain at that particular position, or fall completely open. To compensate for the rotation of the window panel assembly, without the loose coupling between the slide and the window regulator mechanism, a special coupling is desired and described below.

FIG. 18 is one embodiment 260 including such a special coupling Embodiment 260 includes a glide assembly 262 for use in connecting arm 214 of window regulator mechanism M to a molded attachment flange 264. Glide assembly 262 includes a slide 266 having a generally rectangular body 268 with a securing aperture 269, an upper channel 270 and a lower channel 272 defined by vertically extending flanges 274. Each channel 270, 272 has a convex floor 276 and sloping inner walls 278 which in effect are normal to convex floor 276. The angle between sloping inner walls 278 will vary and depend upon the amount of rotation provided between window regulator mechanism M and the window panel assembly when moved up and down. Convex surfaces 276 of channels 270, 272 engage concave surfaces defined in upper and lower surfaces 280, 282 of opening 284 in attachment flange 264. It is preferred that the width of upper and lower surfaces 280, 282 of opening 284 be considerably narrower than the width of channels 270, 272 so that slide 266 may pivot in the direction of arrows A within the opening about its longitudinal axis L. The pivot angle of the slide may be increased by beveling edges 286 of upper and lower surfaces 280, 282, thus giving the slide maximum rotation. With the rotational movement provided by the convex/concave surfaces between the slide and the slot, and maintaining close tolerances, the slide may be coupled to the arm of the window regulator mechanism using a substantially rigid fastener such as the bolt or screw 212 in the arrangement described above without the need for increased clearances between the slide and fastener. Again, as with previous embodiments, opening 284 includes an enlarged rectangular opening area 188 for receipt and installation of slide 266.

FIG. 19 is a sectional view of a generic glide assembly 290 illustrating a preferred embodiment of another universal joint type coupling between slide 292 and arm 214 of window regulator mechanism M. The slide has a generic rectangular body 294 (shown in phantom) and may be used in any one of the molded attachment members described above. As in the above embodiments, slide body 294 has a centrally located hole 296 extending transversely therethrough along the slide's shortest axis. In the instant embodiment, the hole defines a substantially spherical socket 298 located at the geometric center of the slide body. One end 300 of hole 296 entering socket 298 may be larger in diameter than the opposite end 302 of the hole in order to receive a head or member 306 of a spherical coupler 304. The diameter of end 300 of hole 296 receiving head 306 of spherical coupler 304 is such that head 306 may be snapped in and firmly held within socket 298, yet have sufficient freedom to allow head 306 to pivot within the socket. The opposite end 308 of spherical coupler 304 may be rigidly fastened to the arm of window regulator mechanism M. The spherical coupling between the slide and the arm of window regulator mechanism M allows the window attachment assembly to rotate while simultaneously maintaining a rigid, low noise, and responsive coupling with window regulator mechanism M. Body 294 of slide 292 may have excess material removed therefrom to make the slide lighter and more responsive. In such case, socket 298 will be supported by ribs or spokes coupling the socket to the upper and lower channels.

Figure 20:
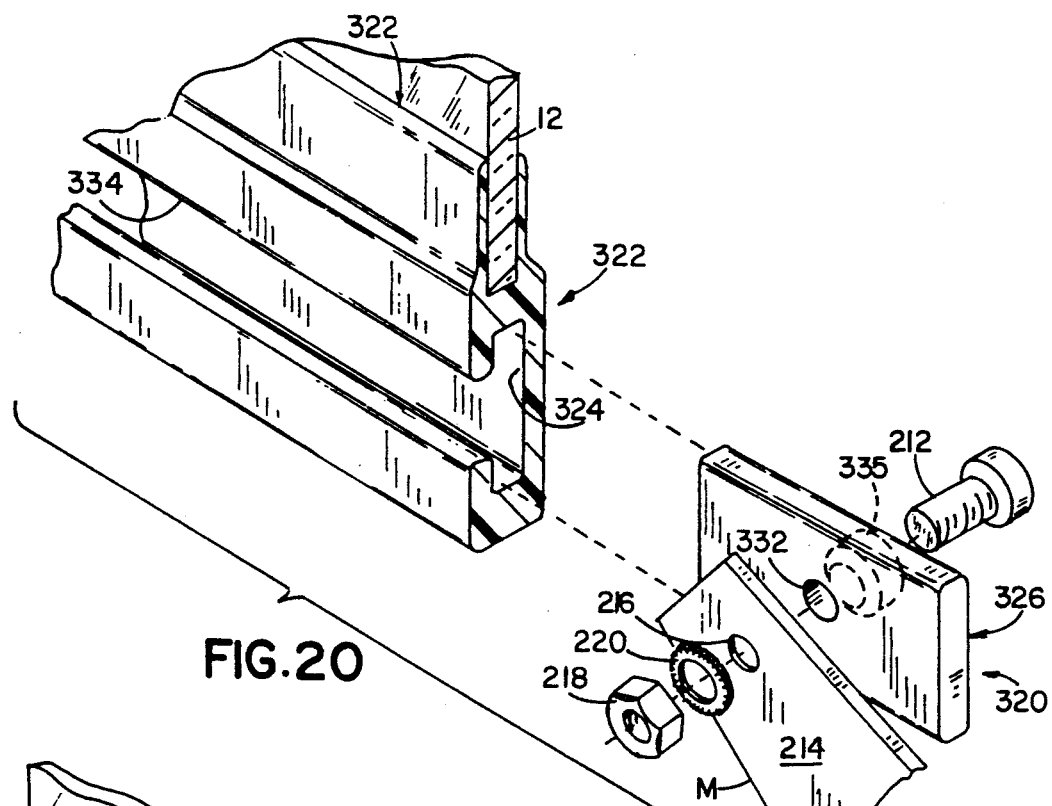
FIG. 20 is an perspective, exploded fragmentary view of a glide assembly for use with the attachment members shown in FIGS. 2-6.

With reference to FIG. 20, embodiment 320 of a glide assembly for use with the attachment members 322 having a C-shaped channel 324 is illustrated and is similar to that shown in FIGS. 2–6. Glide assembly 320 includes a slide 326 having a generally rectangular body with cross-sectional dimensions substantially equal to the cross-sectional dimensions of the interior of channel 224 to facilitate a free gliding motion of slide 326 therein without binding. The rectangular body includes a hole 332 extending therethrough along the shortest dimension and aligned with opening 334 in side of channel 324. Slide 326 may be coupled to arm 214 of window regulator mechanism M by way of a fastener such as a bolt or screw 212 described above and extending through hole 332 in the slide. It would be desirable for the head of the bolt or screw to be recessed within a hole 335 in the side of the slide so as not to interfere with the gliding motion of slide 326 within the channel.

Of the various embodiments of the attachment members described above, it is preferred that each be molded directly onto the window or panel using a process called reaction injection molding (RIM). Although various plastics and resins may be used, such as polyvinylchloride (PVC), vinyl chloride acetate, and the like, it is preferred that a mixture of polyol and isocyanate be used. The two compounds react in an exothermic reaction and cure to form a polyurethane attachment member. It is preferred that the material have a flex modulus or modulus of rigidity approximating 30,000 pounds per square inch. The glide assemblies, shown in FIGS. 14-20 may be constructed from a variety of high strength materials including resins or plastics. It is preferred that each slide be molded from acetal copolymer-based resin such as CELCON made by the Celanese Corporation. Such material has a good memory and is self-lubricating to provide the optimum glide characteristics within the attachment member.

The description of the invention has thus far been directed toward the various embodiments of the attachment members coupled to glass sheet 12, as well as different embodiments of the roller or glide received by the slots of the attachment member. The following discussion, making reference to FIGS. 21-27, will focus on alternate embodiments of another portion of the glide assembly for coupling the rollers or slides to the arm of the window regulator mechanism M.

FIG. 21 shows one embodiment 340 of a cap used to interconnect a roller R or glide assembly G to the end of arm 214 of window regulator mechanism M. Cap 340 has a generally rectangular body 342 having a first or longitudinal axis, X, passing through ends 344, 346; a second intermediate axis, Y, passing through sides 348, 350; and a third and shortest axis, Z, passing through sides 352, 354, each perpendicular to the other. Cap 340, molded from polybutylene terephthalate (PBT) or similar material includes a cavity 356 where its interior dimensions are substantially similar to the exterior dimensions of regulator arm 214 and opens to the exterior of cap 340 through opening 358 located in the end 344 of cap 340. Cap 340 is adapted to be placed over the end of regulator arm 214 by sliding the arm into cavity 356. In one embodiment, cap 340 may be retained on the end of the arm by pressure or with an adhesive. In another embodiment, mechanical detents 360 may be employed in the cavity of the cap to engage notches 366 formed in the sides of regulator arm 214 as shown in FIG. 22, thus allowing the cap to be placed on the end of the arm, but not easily removed.

Figure 22:
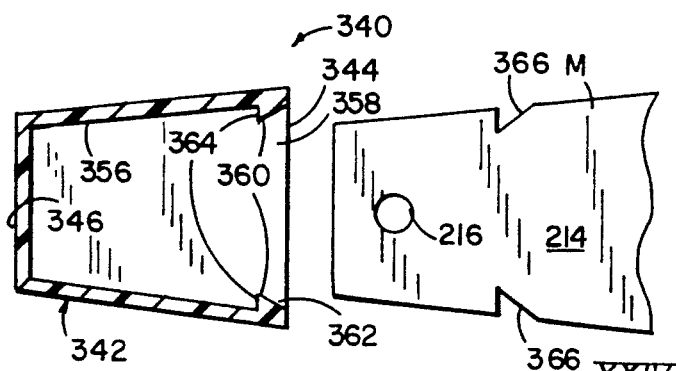
FIG. 22 is a sectional view of the cap in FIG. 21 along plane XXII—XXII.

In FIG. 22, cap 340 is shown with cavity 356 formed therein and receiving one end of regulator arm 214. Located near the entrance 358 of the cavity at end 344 are projections or detents 360 extending into the cavity. Projections 360 have a gradually sloping surface 362 from end 344 toward end 346. A sharp break occurs at the end of the sloping surface 362 and forms a shoulder 364. Each projection is received in a notch 366 formed in the edges of arm 214 and having a shape identical to each projection.

Figure 24:
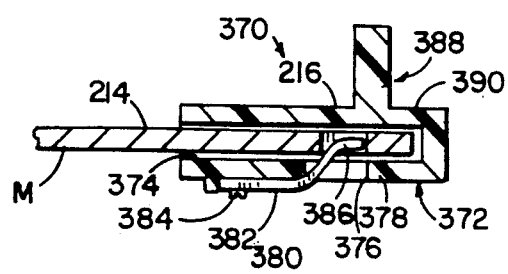
FIG. 24 is a sectional view of the cap in FIG. 23 along plane XXIV—XXIV.
Figure 23:
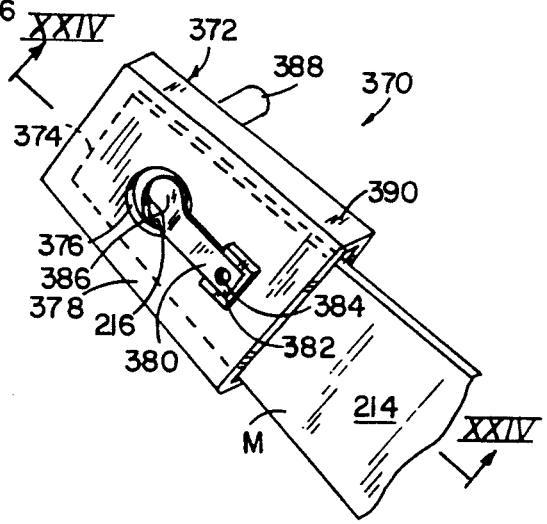
FIG. 23 is an perspective view of another embodiment of a cap for use on the end of a window regulator mechanism.

As shown in FIGS. 23 and 24, another embodiment 370 of a cap for use on the end of regulator arm 214 is illustrated. As in the previous embodiments, cap 370 has a generally rectangular, but slightly tapered body 372 enclosing a cavity 374 for receiving the end of regulator arm 214. The cap has a hole 376 passing through one side 378 and aligned with hole 216 passing through the end of regulator arm 214 when the cap is in place. A spring 380, preferably formed from spring steel, located on side 378 of the cap is positioned so that one or a first end 382 is fixed to side 378 of the cap by an anchor 384 and the opposite or second end 386 passes through hole 376 and is located within hole 216 in the regulator arm 214. End 386 of spring 380 engages the side of hole 216 and prevents the cap from inadvertently coming off the end of the regulator arm. The cap may be slidably removed by withdrawing end 386 of the spring from hole 216.

Figure 25:
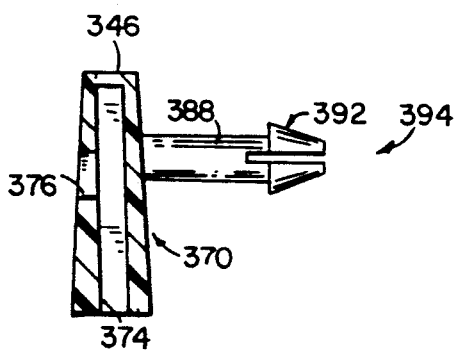
FIG. 25 is a general illustration of a stud or pin extending from the in FIG. 23.
Figure 26:
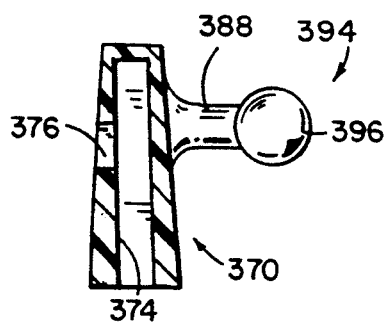
FIG. 26 is a general illustration of a ball disposed at the end of the stud extending from the cap of FIG. 23.

Cap 370 has a pin or stud 388 extending from side 390 opposite side 378 containing the spring. The shape of the stud will vary depending upon which of the above embodiments are employed. In the embodiments employing a bolt and nut arrangement for coupling the glide to the arm of the regulator mechanism, such as shown in FIG. 15, stud 388, as shown in FIG. 25, may have a frusto-conical flange 392 at its tip 394 for locking the pin in the slide. Embodiments of the panel assembly where the slide pivots about a spherical coupler, pin or stud 388 may have a ball 396 formed at tip 394, as shown in FIG. 26.

Figure 27:
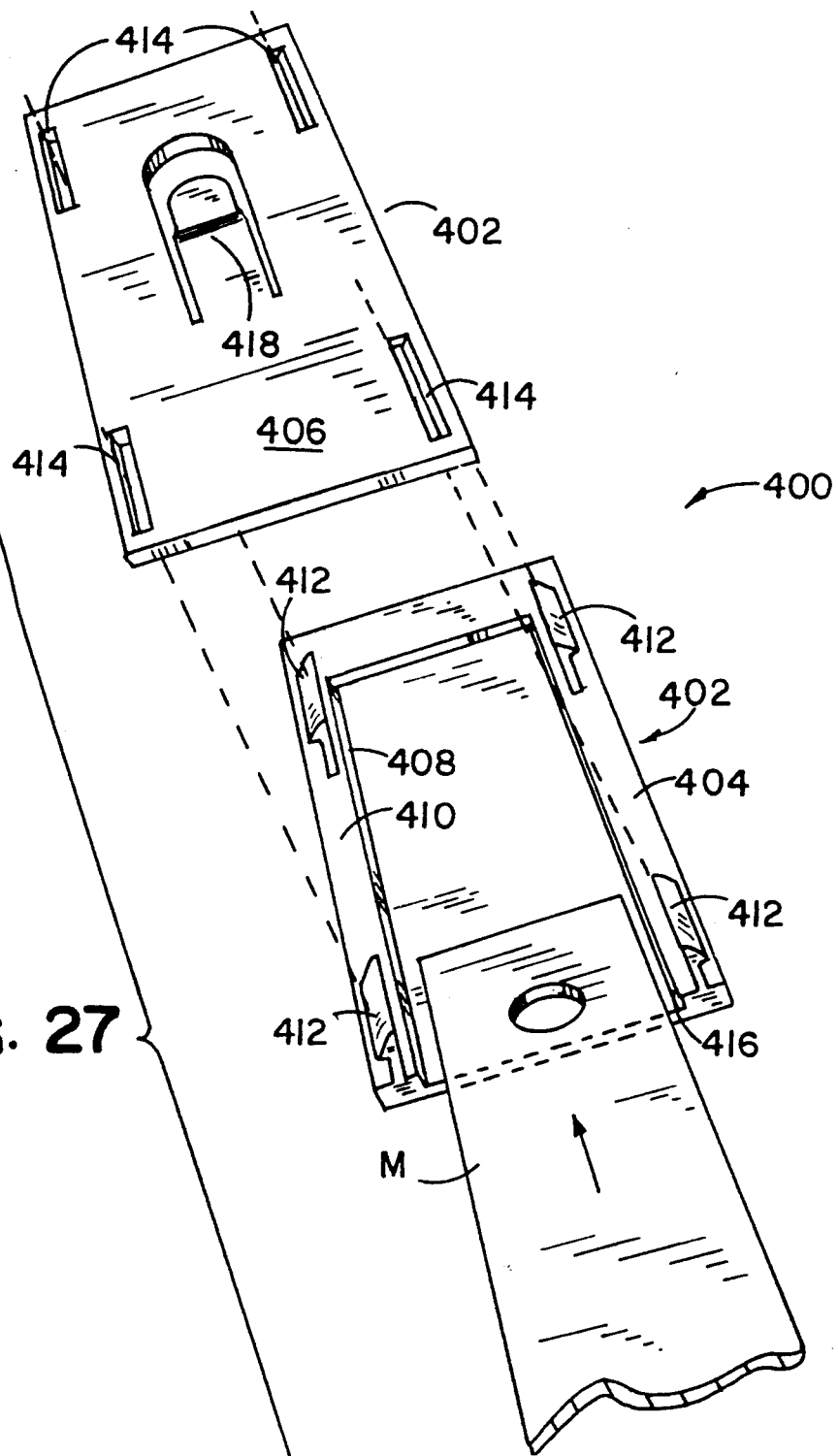
FIG. 27 is a perspective, exploded view of an alternate embodiment of the cap illustrating an integral spring member.

As shown in FIG. 27, another embodiment 400 of a cap has a two-piece body 402 comprised of a first or front portion 404 and a second or back portion 406 both preferably molded from metal resin such as CELCON. Front portion 404 has essentially the same basic shape as the previously described embodiments of caps with the exception that cavity 408 is exposed along one side 410. A plurality of posts 412 extend from the cap perpendicular to side 410 and include barbs to engage and lock in hole or slots 414 defined in the second or back portion 406. The posts bring back portion 406 in registered alignment with front portion 404 and close the cavity 408 and form the entrance 416. The back portion has an integrally formed spring 418 adapted to engage hole 216 in the end of regulator arm 214 when the cap is in place. Thus, integral spring 418 prevents the unintentional removal of the cap from the end of the regulator arm.

As briefly mentioned above, one of the objects and advantages of the invention is the ease of assembly existing in originally manufactured vehicles. A further advantage is a reduction in inventory accounting because the panel assembly may be shipped preassembled. That is, the window panel, attachment member, and the glide assembly may be preassembled before shipping to the manufacturer, dealer or body shop. The window or panel assembly, having one or more attachment members molded to the lower edge thereof, may be selected for the appropriate vehicle. The spherical coupler or ball stud extending from the molded cap may be snapped into the socket of the slide before placing the slide within the slot of a panel attachment member. The glide assembly, consisting of the slide and spherical coupler and cap, is coupled to the attachment member by inserting the slide in the enlarged opening located at one or either end of the attachment member. The slide is moved far enough along the slot and may be temporarily retained thereon so as not to be lost in shipment. Before the panel or window assembly is inserted in the vehicle, location of the one or more slides is determined by matching the holes in the slide with the access holes provided in the door panel. In the alternative, the attachment member may be pre-marked for the location of the slides for a particular vehicle. The window or panel assembly is lowered into the door panel opening with the glide assembly appropriately located such that the cap may be locked into position on the ends of the regulator arms. To remove the window or panel assembly, the operator may simply pop or unsnap the spherical coupler from the socket in each slide and remove the window or panel assembly. In the alternative, the operator may remove the cap from the end of the regulator mechanism before removing the window panel.

Although the assembly of the window panel was described with reference to the spherical coupling with the slide, it is understood that other coupling mechanisms such as bolts or flanged pins may be used equally as well. Moreover, although the above description was made with reference to a single attachment member located along the lower edge of the window or panel assembly, it is considered to be within the scope of this invention that more than one attachment member be provided.

For each of the various embodiments of the cap described above, each is intended to offer a rapid adaptation of the end of the window regulator arm to a glide located in the attachment member molded to the rim of the glass panel. The caps are intended to be easily installed over the ends of the window regulator mechanisms and coupled to the slide in gliding engagement with the slots of the window attachment member. As the window regulator mechanism is moved, the coupling through the cap to the glide causes the window panel to move to the desired position.

While several forms of the invention have been shown and described, other forms will now be apparent to those skilled in the art. Therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows:

1. A panel assembly for vehicles, comprising:
a sheet of material having side surfaces and a peripheral edge;
at least one attachment member molded from a moldable material on said peripheral edge of said sheet such that said attachment member is securely adhered to said sheet, said attachment member having at least one slot extending along the length thereof;
a window regulator mechanism; and
glide means for slidably coupling said window regulator mechanism to said one slot whereby said window regulator assembly moves said panel assembly between desired positions.

2. A panel assembly for vehicles, comprising:
a sheet of material having side surfaces and a peripheral edge;
at least one attachment member molded from a moldable material on said peripheral edge of said sheet such that said attachment member is securely adhered to said sheet, said attachment member having at least one slot extending along the length thereof;
a window regulator mechanism;
glide means for coupling said window regulator mechanism to said one slot whereby said window regulator assembly moves said panel assemby between desired positions, said glide means for coupling said window regulator assembly including a slide disposed within said slot and adapted to slide back and forth therein, said slide having a hole extending therethrough and aligned with said slot; and
means coupled to said window regulator mechanism and adapted to be received by the hole in said slide for coupling said window regulator mechanism to said attachment member.

3. The panel assembly of claim 2, wherein said means coupled to said window regulator mechanism includes a pin having a first end coupled to said window regulator mechanism and a second end received by the hole in said slide.

4. The panel assembly of claim 3, wherein said pin has said first end threadably coupled to said window regulator mechanism.

5. The panel assembly of claim 3, wherein the hole in said slide defines a ball socket.

6. The panel assembly of claim 5, wherein the second end of said pin comprises a ball member for engaging the ball socket in said slide.

7. The panel assembly of claim 6, wherein said pin is an integral extension of a cap slidably received by said window regulator mechanism.

8. The panel assembly of claim 7, further comprising means for retainirg said cap on said window regulator mechanism.

9. The panel assembly of claim 8, wherein said window regulator mechanism has at least one arm having a free end with side surfaces and a peripheral edge;
said means for retaining said cap on said window regulator mechanism includes a spring disposed on said cap and adapted to be received by a hole in said one arm whereby said spring engages said hole and prevents said cap from being removed.

10. The panel assembly of claim 9, wherein said means for retaining said cap on said window regulator mechanism includes an internal detent within said cap for catching a groove defined in the peripheral edge of said at least one arm.

11. The panel assembly of claim 7, wherein said cap comprises a body adapted to receive an end of said window regulator mechanism.

12. The panel assembly of claim 11, wherein said window regulator mechanism includes a hole therein;
said cap having an integrally formed retaining spring for engaging said hole in said window regulator mechanism to prevent said cap from coming off said mechanism.

13. The panel assembly of claim 7, wherein said cap comprises:
a first member having a spherical coupler defined thereon; and
a second member coupled to said first member forming a cavity between the first and second member for receiving an end of the window regulator mechanism.

14. The panel assembly of claim 13, wherein said first and second member are coupled by an adhesive.

15. The panel assembly of claim 13, wherein said first and second members are coupled by fasteners.

16. The panel assembly of claim 2, wherein said slide comprises:

a body having sides and an upper and a lower channel defined by flanges extending from said body; and a socket defined in said body and having at least one opening extending from said socket to one of said sides of said body.

17. The panel assembly of claim 16, wherein said means for coupling said window regulator mechanism to said slide includes a stud having a ball at one end and received by said one opening in said slide and an opposite end connected to an end of said window re mechanism.

18. The panel assembly of claim 16, wherein said means for coupling said window regulator mechanism to said slide includes:

a cap including said socket received about a portion of said window regulator mechanism and having a ball stud extending therefrom for receipt by said slide; and means for retaining said cap on said window regulator assembly.

19. The panel assembly of claim 16, wherein the upper and lower channel of said body have a convex floor and inclined sidewalls.

20. A panel assembly for vehicles, comprising:

a sheet of material having side surfaces and a peripheral edge;

at least one attachment member molded from a moldable material on said peripheral edge of said sheet such that said attachment member is securely adhered to said sheet, said attachment member having at least one slot extending along the length thereof;

a window regulator mechanism; and glide means for coupling said window regulator mechanism to said one slot whereby said window regulator assembly moves said panel assembly between desired positions, said attachment member further including means integral with said attachment member for making said member rigid.

21. A panel assembly for vehicles, comprising:

a sheet of material having side surfaces and a peripheral edge;

at least one attachment member molded from a moldable material on said peripheral edge of said sheet such that said attachment member is securely adhered to said sheet, said attachment member having at least one slot extending along the length thereof;

a window regulator mechanism; and glide means for coupling said window regulator mechanism to said one slot whereby said window regulator assembly moves said panel assembly between desired positions, said slot further including an upper and a lower surface, each surface having a flange extending therefrom to define at least one upper and lower rail.

22. A window assembly for a vehicle, comprising:

a panel having side surfaces and a peripheral edge;

an attachment member molded from a moldable material on said peripheral edge of said panel and having a slot having closed ends and continuous upper and lower surfaces defined therein;

a slide disposed in the slot;

a window regulator mechanism having at least one arm for moving said window between desired positions; and means attached to said one arm and coupled to the slide whereby actuation of said regulator mechanism moves said window between the desired positions.

23. The window assembly of claim 22, wherein said slot in said attachment member extends entirely therethrough providing a first and a second substantially parallel slot surfaces.

24. A window assembly for a vehicle, comprising:

a panel having side surfaces and a peripheral edge;

an attachment member molded from a moldable material on said peripheral edge of said panel and having a slot defined therein;

a slide disposed in the slot;

a window regulator mechanism having at least one arm for moving said window between desired positions;

means attached to said one arm and coupled to the slide whereby actuation of said regulator mechanism moves said window between the desired positions;

said slot in said attachment member extending entirely therethrough providing a first and a second substantially parallel slot surfaces; and said first and second substantially parallel slot surfaces further include at least one flange extending from each of said first and second slot surfaces toward the center of said slot.

25. The window assembly of claim 24, wherein said slide includes a body having a cross-sectional profile corresponding to the cross-sectional profile of said one slot.

26. The window assembly of claim 25, wherein said slide has a socket therein.

27. The window assembly of claim 26, wherein said means attached to said one arm and coupled to said slide include a ball stud having a spherical end received in said socket in said slide, and an end opposite the spherical end coupled to the at least one arm of the window regulator mechanism.

28. The window assembly of claim 26, wherein said means attached to said one arm and coupled to said slide include a cap received about a portion of said one arm of said window regulator mechanism and having a pin extending therefrom for engaging said slide and means for retaining said cap on said one arm.

29. The window assembly of claim 28, wherein said pin further comprises a spherical coupler.

30. The window assembly of claim 28, wherein said cap further comprises:

a body having a cavity for receiving said at least one arm; and detent means for retaining said cap on said at least one arm.

31. The window assembly of claim 30, wherein said detent means for retaining said cap on said one arm include at least one projection defined within the cavity of said body for engaging a notch in the peripheral edge of said one arm.

32. The window assembly of claim 30, wherein said one arm of said window regulator mechanism includes a hole;

said detent means for retaining said cap on said one arm including a spring having one end secured to said cap and an opposite end adapted to be received by said hole in said one arm, said end of said spring received in said hole of said one arm preventing removal of said cap from said arm.

33. A panel assembly for a vehicle comprising:

a sheet of material having opposite side surfaces and a peripheral edge;

an attachment member molded from a moldable material on said sheet material along said peripheral edge such that the attachment member is securely attached thereto during molding, the attachment member having at least one slot defined therein; and a slide in gliding engagement within said at least one slot and retained therein by flanges extending from said slide.

34. The panel assembly of claim 33, wherein the sheet of material is a transparent window.

35. The panel assembly of claim 33, wherein the attachment member comprises:

a flange formed from moldable, resinous material extending from the peripheral edge of the sheet of material and having securing flanges extending along both side surfaces of the sheet and encapsulating the peripheral edge with said one slot extending along the length of the attachment member; and means below said one slot in said attachment member for providing a rigid portion of the attachment member.

36. The panel assembly of claim 35, wherein said means for providing a rigid portion of the attachment member include a stiffener extending along the length of said attachment member.

37. The panel assembly of claim 36, wherein said stiffener is within the attachment member.

38. The panel assembly of claim 36, wherein said stiffener is a rigid bar.

39. The panel assembly of claim 33, wherein said slide comprises:

a body having an upper and a lower channel defined therein by outwardly extending flanges, said upper and lower channels each having a width slightly greater than a width of said one slot in said attachment member to slide in gliding engagement within said slot; and said body being retained in said slot by said flanges on each side of said attachment member.

40. The panel assembly of claim 33, wherein said attachment member further comprises a first and a second flange extending inwardly toward a centerline of said one slot from opposed first and a second surfaces of said slot.

41. The panel assembly of claim 40, wherein said slide comprises a body having an upper and a lower channels defined by outwardly extending flanges, said upper and lower channels each having a width slightly greater than a width of said first and second flanges extending from said opposed first and second surfaces of said slot.

42. The panel assembly of claim 33, wherein said one slot in said attachment member has a first and a second concave surface opposite each other.

43. The panel assembly of claim 42, wherein said slide comprises a body having an upper and a lower channel between outwardly extending flanges, said upper and lower channels each having a convex floor and inclined walls, said slide received by said one slot in gliding engagement therein and being pivotable about a longitudinal axis of said slot.

44. The panel assembly of claim 33, further comprising:

a regulator means for moving the panel assembly between desired positions; and means interconnecting said slide and said regulator means for moving the panel assembly in response to said regulator means.

45. The panel assembly of claim 44, wherein said means interconnecting said slide and said regulator means include a cap affixed to said regulator means and having a pin extending therefrom and received by said slide.

46. The panel assembly of claim 45, wherein said pin extending from said cap has a spherical head.

47. The panel assembly of claim 45, wherein said pin extending from said cap has a split frusto-conical head.

48. A panel assembly for vehicles, comprising:

a sheet of material having side surfaces and a peripheral edge;

at least one attachment member molded from a moldable material on said peripheral edge of said sheet such that said attachment member is securely adhered to said sheet, said attachment member having at least one slot extending along the length thereof;

a window regulator mechanism;

coupling means for coupling said window regulator mechanism to said one slot for movement along said slot whereby said window regulator assembly moves said panel assembly between desired positions; and means integral with said attachment member for making at least a portion of said attachment member rigid.

* * * * *

UNITED STATES PATENT AND TRADEMARK OFFICE
CERTIFICATE OF CORRECTION

PATENT NO. : 5,243,785

DATED : September 14, 1993

INVENTOR(S) : KEITH A. NIEBOER and ROGER L. KOOPS

It is certified that error appears in the above-identified patent and that said Letters Patent is hereby corrected as shown below:

Col. 4, line 52;
    After "gasket" insert --portions on--.
Col. 5, line 50;
    After "from the" insert --cap shown--.
Col. 7, line 28;
    "Chemlook" should be --Chemlock--.
Col. 11, line 25;
    "an resiliency" should be --and resiliency--.
Col. 13, line 23;
    "inward sc" should be --inward so--.
Col. 13, line 55;
    "chanca" should be --chance--.
Col. 13, line 62;
    After "coupling" insert --.--.
Col. 14, line 68;
    Before "side" insert --a--.
Col. 18, line 31;
    "retainirg" should be --retaining--.
Col. 19, line 10, claim 17;
    "re" should be --regulator--.

Signed and Sealed this

Twenty-eighth Day of June, 1994

*Attest:*

BRUCE LEHMAN

*Attesting Officer*     *Commissioner of Patents and Trademarks*